United States Patent
Yin et al.

(10) Patent No.: US 11,288,219 B2
(45) Date of Patent: Mar. 29, 2022

(54) USB SWITCHING CIRCUIT AND ELECTRONIC APPARATUS HAVING THE SAME

(71) Applicant: Realtek Semiconductor Corporation, Hsinchu (TW)

(72) Inventors: Kai-Yuan Yin, Suzhou (CN); Wen-Bin Wu, Suzhou (CN); Leaf Chen, Hsinchu (TW); Bo-Yu Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/081,518

(22) Filed: Oct. 27, 2020

(65) Prior Publication Data

US 2021/0141753 A1 May 13, 2021

(30) Foreign Application Priority Data

Nov. 13, 2019 (CN) .......................... 201911106190.4

(51) Int. Cl.
*G06F 13/40* (2006.01)
*G06F 13/42* (2006.01)

(52) U.S. Cl.
CPC ...... *G06F 13/4022* (2013.01); *G06F 13/4068* (2013.01); *G06F 13/4282* (2013.01); *G06F 2213/0042* (2013.01)

(58) Field of Classification Search
CPC ............. G06F 13/4022; G06F 13/4282; G06F 13/4068; G06F 2213/0042
USPC ........... 710/8, 10–11, 15, 62, 100, 104–105; 370/250
See application file for complete search history.

(56) References Cited

U.S. PATENT DOCUMENTS 4,791,311 A * 12/1988 Vig ..................... B60R 16/0315
307/10.1
6,351,809 B1 * 2/2002 St. Pierre, Jr. ...... G06F 13/4068
710/10
6,570,946 B1 * 5/2003 Homol ................. H03K 23/667
327/113

(Continued)

FOREIGN PATENT DOCUMENTS

CN 105656471 A 6/2016

*Primary Examiner* — Idriss N Alrobaye
*Assistant Examiner* — Henry W Yu
(74) *Attorney, Agent, or Firm* — Locke Lord LLP; Tim Tingkang Xia, Esq.

(57) ABSTRACT

A USB switching circuit includes a first multiplexer, a second multiplexer coupled with the first multiplexer through transmission paths, and a voltage regulation circuit coupled with the first and second multiplexers. The first multiplexer distributes first data signals to the transmission paths according to first control signals. The second multiplexer distributes a second data signal to the transmission paths according to second control signals. The voltage regulation circuit sets a maximum voltage and a minimum voltage of the first data signals to corresponding to a common voltage. The maximum voltage of the first data signals is not higher than a maximum voltage of the second control signals, or the minimum voltage of the first data signals is not lower than a minimum voltage of the second control signals. The first data signals and the second data signal are generated according to different communication protocols.

20 Claims, 6 Drawing Sheets

(56) References Cited

U.S. PATENT DOCUMENTS

| | | | | |
|---|---|---|---|---|
| 7,346,728 B1* | 3/2008 | Jackson | ............... | G06F 13/4045 |
| | | | | 710/313 |
| 8,558,578 B1* | 10/2013 | Williams | ............ | G06F 12/0246 |
| | | | | 326/86 |
| 8,799,537 B1* | 8/2014 | Zhu | ....................... | G06F 13/385 |
| | | | | 710/54 |
| 10,152,442 B2* | 12/2018 | Bowers | ............... | G06F 13/4295 |
| 10,320,180 B1* | 6/2019 | Venigalla | ................. | G06F 1/266 |
| 10,381,787 B1* | 8/2019 | Bodnaruk | ............ | G06F 13/4282 |
| 10,990,560 B2* | 4/2021 | Khamesra | ........... | G06F 13/4068 |
| 2015/0309726 A1* | 10/2015 | Mccall | .................... | G06F 3/061 |
| | | | | 710/5 |
| 2018/0335818 A1* | 11/2018 | Mattos | ................... | G06F 1/266 |
| 2020/0105316 A1* | 4/2020 | Sridharan | ................. | G06F 1/26 |

* cited by examiner

USB SWITCHING CIRCUIT AND ELECTRONIC APPARATUS HAVING THE SAME

CROSS-REFERENCE TO RELATED APPLICATION

This application claims priority to Chinese Application Serial Number 201911106190.4, filed Nov. 13, 2019, which is herein incorporated by reference in its entirety.

BACKGROUND

Field of Invention

The present disclosure generally relates to an electronic device including a universal serial bus (USB) interface. More particularly, the present disclosure relates to an electronic device and a switching circuit thereof suitable for the DisplayPort alternate mode.

Description of Related Art

Type-C universal serial bus (USB Type-C) interface is multiplexed and small in size, and has rotationally-symmetrical connectors so that it has been adopted by various electronic devices. At present, the DisplayPort interface is successfully integrated with USB Type-C interface owing to the DisplayPort alternate (DP Alt) mode standard, which makes USB Type-C interface has a variety of functions, such as transmitting data, multi-media, and power. USB Type-C interface is expected to solve the current chaotic situation of transmission interfaces, however, the USB host of an electronic device operated in the DP Alt mode may, because of leakage currents of multiplexers thereof, erroneously determine the connection state of an external device.

SUMMARY

The disclosure provides a universal serial bus (USB) switching circuit including a first multiplexer, a second multiplexer, and a voltage regulation circuit. The first multiplexer is configured to distribute multiple first data signals received by the first multiplexer to multiple transmission paths according to multiple first control signals. The second multiplexer is coupled with the first multiplexer through the multiple transmission paths, and is configured to distribute a second data signal received by the second multiplexer to the multiple transmission paths according to multiple second control signals. The voltage regulation circuit is coupled with the first multiplexer and the second multiplexer, and is configured to set a maximum voltage and a minimum voltage of the multiple first data signals received by the first multiplexer to corresponding to a common voltage. The maximum voltage of the multiple first data signals received by the first multiplexer is lower than or equal to a maximum voltage of the multiple second control signals, or the minimum voltage of the multiple first data signals received by the first multiplexer is higher than or equal to a minimum voltage of the multiple second control signals. The multiple first data signals and the second data signal are generated according to different communication protocols.

The disclosure provides an electronic device including a USB host, a DisplayPort signal source, a USB switching circuit, and an isolation circuit. The USB switching circuit includes a first multiplexer, a second multiplexer, and a voltage regulation circuit. The first multiplexer is configured to distribute multiple first data signals from the DisplayPort signal source to multiple transmission paths according to multiple first control signals. The second multiplexer is coupled with the first multiplexer through the multiple transmission paths, and is configured to distribute a second data signal from the USB host to the multiple transmission paths according to multiple second control signals. The voltage regulation circuit is coupled with the first multiplexer and the second multiplexer, and configured to set a maximum voltage and a minimum voltage of the multiple first data signals received by the first multiplexer to corresponding to a common voltage. The maximum voltage of the multiple first data signals received by the first multiplexer is lower than or equal to a maximum voltage of the multiple second control signals, or the minimum voltage of the multiple first data signals received by the first multiplexer is higher than or equal to a minimum voltage of the multiple second control signals. The isolation circuit is coupled with the DisplayPort signal source, and coupled with the first multiplexer through the voltage regulation circuit.

The disclosure provides an electronic device including a USB host, a DisplayPort signal source, a voltage regulation circuit, a USB switching circuit coupled with the voltage regulation circuit, and an isolation circuit. The USB switching circuit includes a first multiplexer and a second multiplexer. The a first multiplexer is configured to distribute multiple first data signals from the DisplayPort signal source to multiple transmission paths according to multiple first control signals. The second multiplexer is coupled with the first multiplexer through the multiple transmission paths, and is configured to distribute a second data signal from the USB host to the multiple transmission paths according to multiple second control signals. The voltage regulation circuit is configured to set a maximum voltage and a minimum voltage of the multiple first data signals received by the first multiplexer to corresponding to a common voltage. The maximum voltage of the multiple first data signals received by the first multiplexer is lower than or equal to a maximum voltage of the multiple second control signals, or a minimum voltage of the multiple first data signals received by the first multiplexer is higher than or equal to a minimum voltage of the multiple second control signals. The isolation circuit is coupled with the DisplayPort signal source, and is coupled with the first multiplexer through the voltage regulation circuit.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
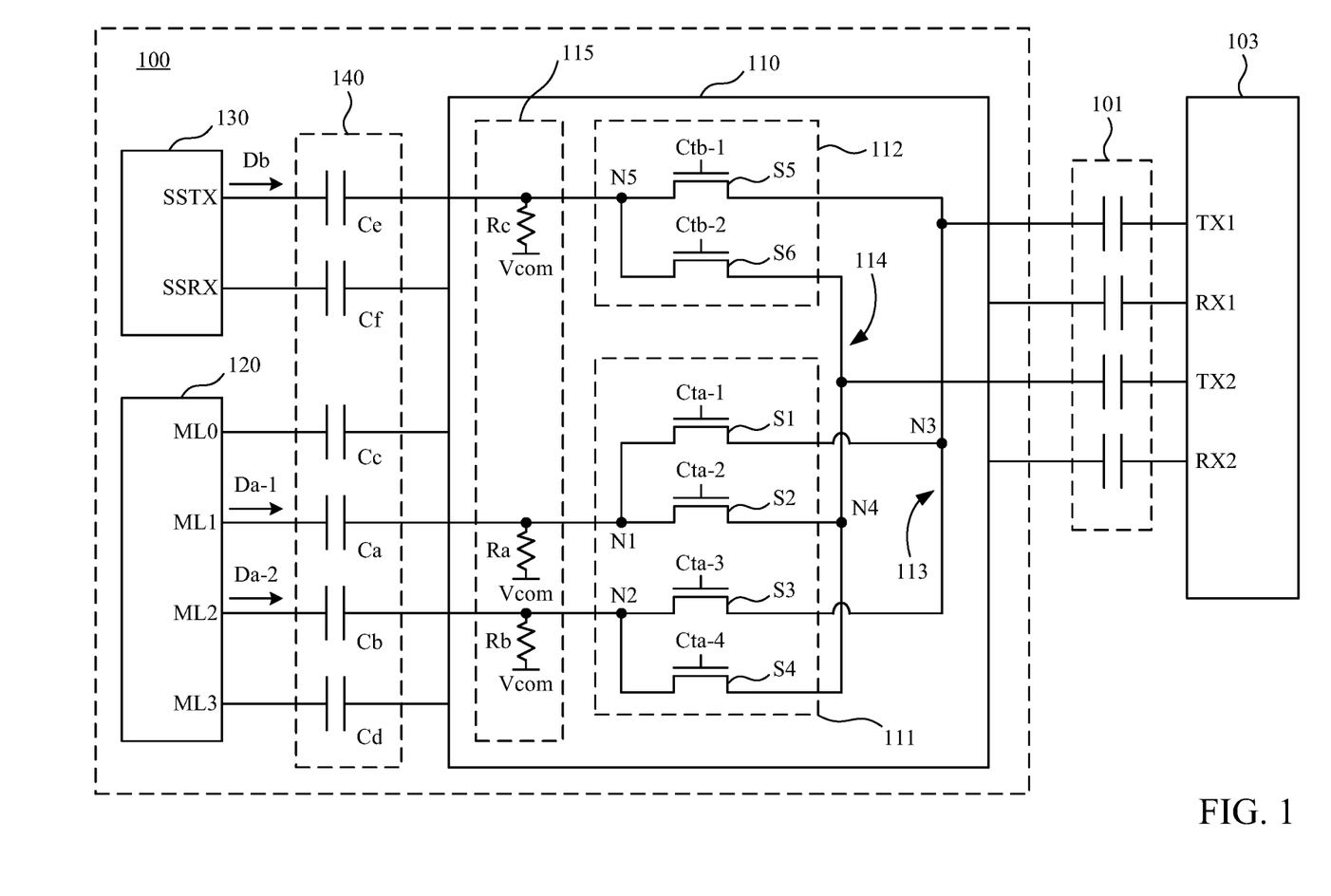
FIG. 1 is a simplified functional block diagram of an electronic device according to one embodiment of the present disclosure.

FIG. 1 is a simplified functional block diagram of an electronic device 100 according to one embodiment of the present disclosure. The electronic device 100 comprises a universal serial bus (USB) switching circuit 110, a DisplayPort signal source 120, a USB host 130, and an isolation circuit 140. The electronic device 100 is coupled with the USB connector 103 through coupling capacitors 101. The USB connector 103 comprises signal pins TX1, TX2, RX1, and RX2, and may be coupled with an external device (not shown in FIG. 1). The electronic device 100 may conduct data communications with the external device via the USB connector 103.

In some embodiments, the electronic device 100, the coupling capacitors 101, and the USB connector 103 are disposed on a substrate (e.g., a printed circuit board) of a notebook computer, a personal computer, or a mobile device. The coupling capacitors 101 may be realized by various suitable capacitors, such as multi-layer ceramic capacitors (MLCC). The aforesaid external device may be realized by a display device, a docking station, or a dongle.

In one embodiment, the USB connector 103 is a USB Type-C receptacle.

In another embodiment, each of the DisplayPort signal source 120 and the USB host 130 may be realized by a corresponding re-driver.

The USB switching circuit 110 comprises a first multiplexer 111 coupled with the DisplayPort signal source 120, and comprises a second multiplexer 112 coupled with the USB host 130. The first multiplexer 111 and the second multiplexer 112 are configured to distribute signals received from the DisplayPort signal source 120 and the USB host 130 to the signal pins TX1 and TX2, so as to achieve both of the DisplayPort alternate mode (DP Alt mode) and the USB transmission mode.

Additionally, the electronic device 100 may further comprise other USB switching circuit configured to distribute signals received by the signal pins RX1 and RX2 to the DisplayPort signal source 120 and the USB host 130. For the purpose of explanation convenience, the other USB switching circuit will be further described in the forthcoming paragraphs in reference with FIG. 2.

The first multiplexer 111 comprises a first switch S1, a second switch S2, a third switch S3, and a fourth switch S4. A first terminal of the first switch S1 and a first terminal of the second switch S2 are coupled with the first node N1. A first terminal of the third switch S3 and a first terminal of the fourth switch S4 are coupled with the second node N2. A second terminal of the first switch S1 and a second terminal of the third switch S3 are coupled with the third node N3. A second terminal of the second switch S2 and a second terminal of the fourth switch S4 are coupled with the fourth node N4. Each of the first switch S1, the second switch S2, the third switch S3, and the fourth switch S4 changes a switching state thereof according to a corresponding one of the first control signals Cta-1~Cta-4.

The first node N1 and the second node N2 are configured to receive first data signals Da-1~Da-2 transmitted from the DisplayPort signal source 120, respectively. The third node N3 and the fourth node N4 are coupled with the transmission paths 113 and 114 of the USB switching circuit 110, respectively. Moreover, the transmission paths 113 and 114 may be used to couple with the signal pins TX1 and TX2, respectively.

The second multiplexer 112 comprises a fifth switch S5 and a sixth switch S6. A first terminal of the fifth switch S5 and a first terminal of the sixth switch S6 are coupled with the fifth node N5. A second terminal of the fifth switch S5 and a second terminal of the sixth switch S6 are coupled with the transmission paths 113 and 114, respectively. Each of the fifth switch S5 and the sixth switch S6 changes a switching state thereof according to a corresponding one of the second control signals Ctb-1 and Ctb-2. Moreover, the fifth node N5 is configured to receive a second data signal Db transmitted from the USB host 130.

In practice, the first switch S1, the second switch S2, the third switch S3, the fourth switch S4, the fifth switch S5, and the sixth switch S6 may be realized by various suitable N-type transistors, such as field-effect transistors or bipolar transistors.

In this embodiment, the DisplayPort signal source 120 uses main link lanes ML1 and ML2 to respectively transmit the first data signals Da-1~Da-2. The USB host 130 uses the super speed differential pair SSTX to transmit the second data signal Db. The main link lanes of the DisplayPort signal source 120 are compliant with the DisplayPort specifications, and the super speed differential pairs of the USB host 130 are compliant with the USB 3.x specifications.

In other words, the first data signals Da-1~Da-2 and the second data signal Db may be realized as differential signals. In some embodiments, the USB switching circuit 110 may comprise two first multiplexers 111 to respectively the process positive phase and the negative phase of the first data signals Da-1~Da-2, and may comprise two second multiplexers 112 to respectively process the positive phase and the negative phase of the second data signal Db. For the sake of brevity, the embodiments of this disclosure are explained by using only one phase (e.g., the positive phase) of the first data signals Da-1~Da-2 and the second data signal Db.

The USB switching circuit 110 further comprises a voltage regulation circuit 115 coupled with the first node N1, the second node N2, and the fifth node N5. The voltage regulation circuit 115 is configured to provide a common voltage Vcom to the first data signal Da-1 transmitted to the first node N1, and also to the first data signal Da-2 transmitted to the second node N2. Therefore, the first data signals Da-1~Da-2 change voltage levels on the basis of the common voltage Vcom, so that each of the first data signals Da-1~Da-2, received by the first multiplexer 111, has a maximum voltage and a minimum voltage corresponding to the common voltage Vcom.

In addition, the voltage regulation circuit 115 also provides the common voltage Vcom to the second data signal Db transmitted to the fifth node N5, so that the second data signal Db received by the second multiplexer 112 has a maximum voltage and a minimum voltage corresponding to the common voltage Vcom.

In some embodiments, the common voltage Vcom is 0.3~1.4 volts (V), and the first data signals Da-1~Da-2, received by the first multiplexer 111, as well as the second data signal Db, received by the second multiplexer 112, are 0~1.7 V. In other words, the first data signals Da-1~Da-2 and the second data signal Db each have amplitude of ±0.3 V based on the common voltage Vcom, but this disclosure is not limited thereto. The common voltage Vcom may be correspondingly adjusted based on practical designs of the first multiplexer 111 and the second multiplexer 112, for example, the common voltage Vcom may be designed according to the threshold voltage or the voltage withstand degree of the transistors.

In specific, the voltage regulation circuit 115 comprises resistors Ra Rc. A first terminal of the resistor Ra is coupled with the first node N1; a first terminal of the resistor Rb is coupled with the second node N2; a first terminal of the resistor Rc is coupled with the fifth node N5. Second nodes of the resistors Ra Rc are configured to receive the common voltage Vcom. In practice, the resistors Ra Rc may be realized by metal wires, poly resistors, or transistors. The resistor symbols in the drawings of this disclosure may be equivalent circuits simplified by Thevenin's Theorem, for example, the voltage regulation circuit 115 may in practice be realized by a voltage dividing circuit coupled between an additional high voltage source, disposed on the motherboard, and the ground so as to obtain the common voltage Vcom having a voltage level between the high voltage source and the ground.

The isolation circuit 140 comprises capacitors Ca~Cf, the capacitors Ca~Cd are coupled between the DisplayPort signal source 120 and the voltage regulation circuit 115, and the capacitors Ce and Cf are coupled between the USB host 130 and the voltage regulation circuit 115. The isolation circuit 140 is configured to isolate the direct component of the first data signals Da-1~Da-2 and the second data signal Db. As a result, after passing the isolation circuit 140, the first data signals Da-1~Da-2 each remain the same amplitude thereof, but the maximum voltage and minimum voltage of each of the first data signals Da-1~Da-2 may be modified. In specific, the capacitor Ca is coupled between the main link lane ML1 and the first node N1. The capacitor Cb is coupled between the main link lane ML2 and the second node N2. The capacitor Ce is coupled between the super speed differential pair SSTX and the fifth node N5.

Figure 2:
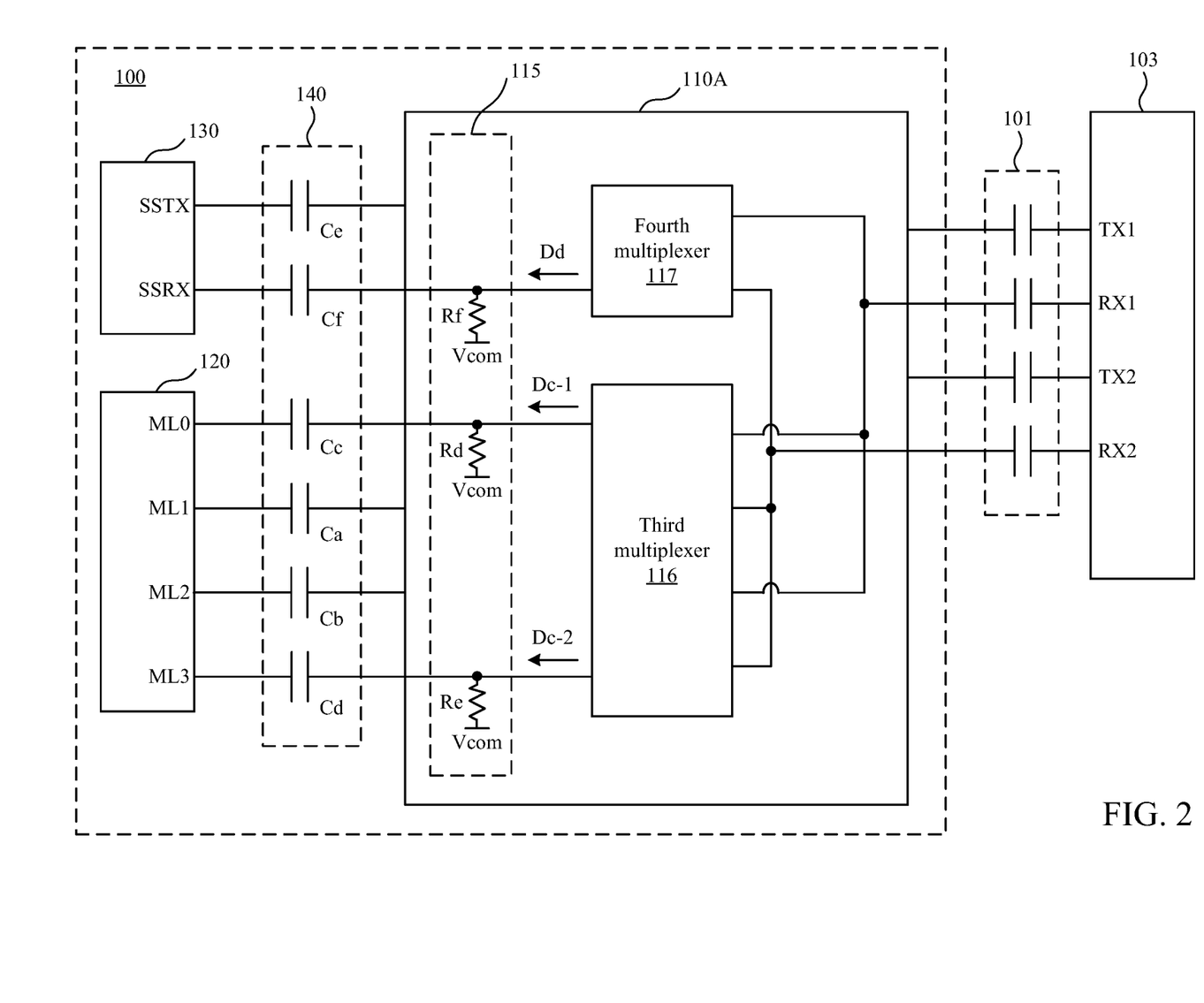
FIG. 2 is a simplified functional block diagram of the electronic device according to another embodiment of the present disclosure.

FIG. 2 is a simplified functional block diagram of the electronic device 100 according to one embodiment of the present disclosure. In this embodiment, the electronic device 100 further comprises a USB switching circuit 110A, and the USB switching circuit 110A comprises a third multiplexer 116 and a fourth multiplexer 117. The third multiplexer 116 is coupled with the main link lanes ML0 and ML3 of the DisplayPort signal source 120, and also coupled with the signal pins RX1 and RX2. The third multiplexer 116 is configured to distribute signals received from the signal pins RX1 and RX2 to the main link lanes ML0 and ML3. The fourth multiplexer 117 is coupled between the super speed differential pair SSRX of the USB host 130 and the signal pins RX1~RX2. The fourth multiplexer 117 is configured to distribute signals received from the signal pins RX1~RX2 to the super speed differential pair SSRX.

In this embodiment, the voltage regulation circuit 115 further comprises resistors Rd~Rf. The resistor Rd is coupled with the main link lane ML0 and the third multiplexer 116. The resistor Re is coupled with the main link lane ML3 and the third multiplexer 116. The resistor Rf is coupled with the super speed differential pair SSRX and the fourth multiplexer 117. The resistors Rd and Re are configured to set the maximum voltage and the minimum voltage of each of the third data signals Dc-1~Dc-2, outputted by the third multiplexer 116, to corresponding to the common voltage Vcom. The resistor Rf is configured to set the maximum voltage and the minimum voltage of the fourth data signal Dd, outputted by the fourth multiplexer 117, to corresponding to the common voltage Vcom.

In addition, the capacitor Cc of the isolation circuit 140 is coupled between the main link lane ML0 and the third multiplexer 116. The capacitor Cd is coupled between the main link lane ML3 and the third multiplexer 116. The capacitor Cf is coupled between the super speed differential pair SSRX and the fourth multiplexer 117.

Figure 3:
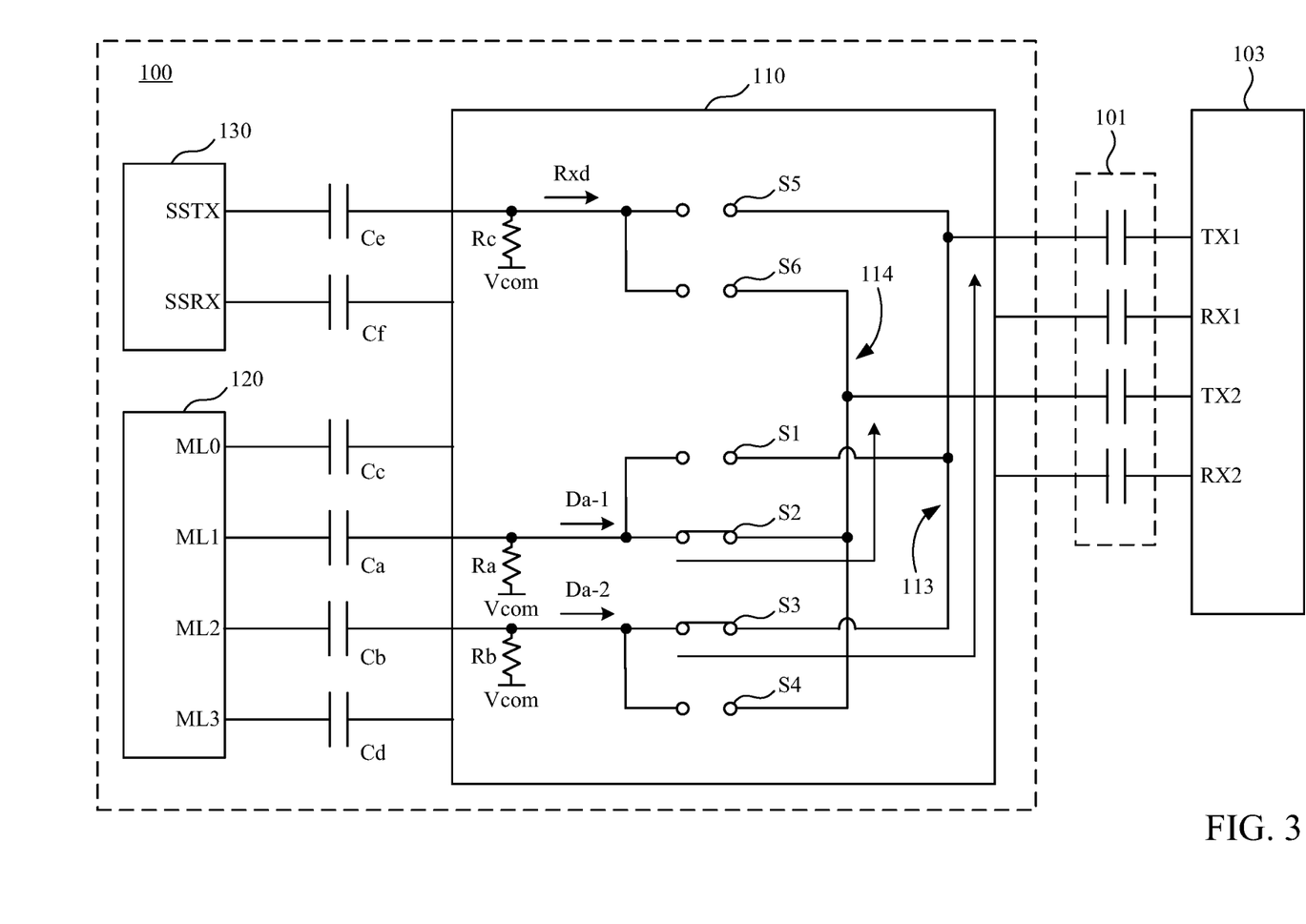
FIG. 3 is a schematic diagram of an equivalent circuit for illustrating the operation of the electronic device of FIG. 1 according to one embodiment of the present disclosure.

FIG. 3 is a schematic diagram of an equivalent circuit for illustrating the operation of the electronic device 100 according to one embodiment of the present disclosure. In this embodiment, the electronic device 100 is operated in the DP Alt mode for 4 lanes, and the USB connector 103 and the external device (not shown) are coupled in a first cable orientation. Therefore, the second switch S2 and the third switch S3 are conducted, and the first switch S1, the fourth switch S4, the fifth switch S5, and the sixth switch S6 are switched off. The aforesaid first cable orientation may be a situation that the first configuration channel (CC1) of the USB connector 103 is coupled with the pull-down resistor (not shown) of the external device.

In this embodiment, since the isolation circuit 140 isolates the direct component of the DisplayPort signal source 120, the first data signals Da-1~Da-2, received by the first multiplexer 111, each have the maximum voltage and the minimum voltage corresponding to the common voltage Vcom provided by the voltage regulation circuit 115. The minimum voltage of first data signals Da-1~Da-2 is higher than or equal to the minimum voltage of second control signals Ctb-1~Ctb-2.

Since the first data signals Da-1~Da-2, received by the first multiplexer 111, have the minimum voltage higher than or equal to the minimum voltage of the second control signals Ctb-1~Ctb-2 (i.e., the voltage in the situation that the fifth switch S5 and the sixth switch S6 are switched off, such as 0 V), the voltage difference between the control terminal and the second terminal (e.g., the gate-source voltage) of each of the fifth switch S5 and the sixth switch S6 will be not higher than 0 V. Therefore, when the fifth switch S5 and the sixth switch S6 are at the switched-off state, the fifth switch S5 and the sixth switch S6 will not be erroneously conducted because of the first data signals Da-1~Da-2 transmitted on the transmission paths 113~114 so that the leakage current is prevent.

In one embodiment, for example, the first data signals Da-1~Da-2 are 0~1.7 V, and the second control signals Ctb-1~Ctb-2 are switched between 0 V and 1.7 V. When the electronic device 100 is operated in the DP Alt mode for 4 lanes, even the second control signals Ctb-1~Ctb-2 can only provide the minimum voltage of 0 V, the voltage difference between the control terminal and the second terminal of each of the fifth switch S5 and the sixth switch S6 is not higher than 0 V. Therefore, the fifth switch S5 and the sixth switch S6 will not be erroneously conducted.

As a result, when the USB host 130 sends out the Rx detection signal Rxd, the Rx detection signal Rxd will not be transmitted to the DisplayPort signal source 120 via the second switch S2 and the third switch S3. The USB host 130 is capable of correctly detecting high impedance and determines that there is no external USB device with which waiting for connection, and thus the USB host 130 will not erroneously try to connect with the external USB device in the DP Alt mode for 4 lanes. In practice, the USB host 130 uses the super speed differential pair SSTX to transmit the Rx detection signal Rxd.

Figure 4:
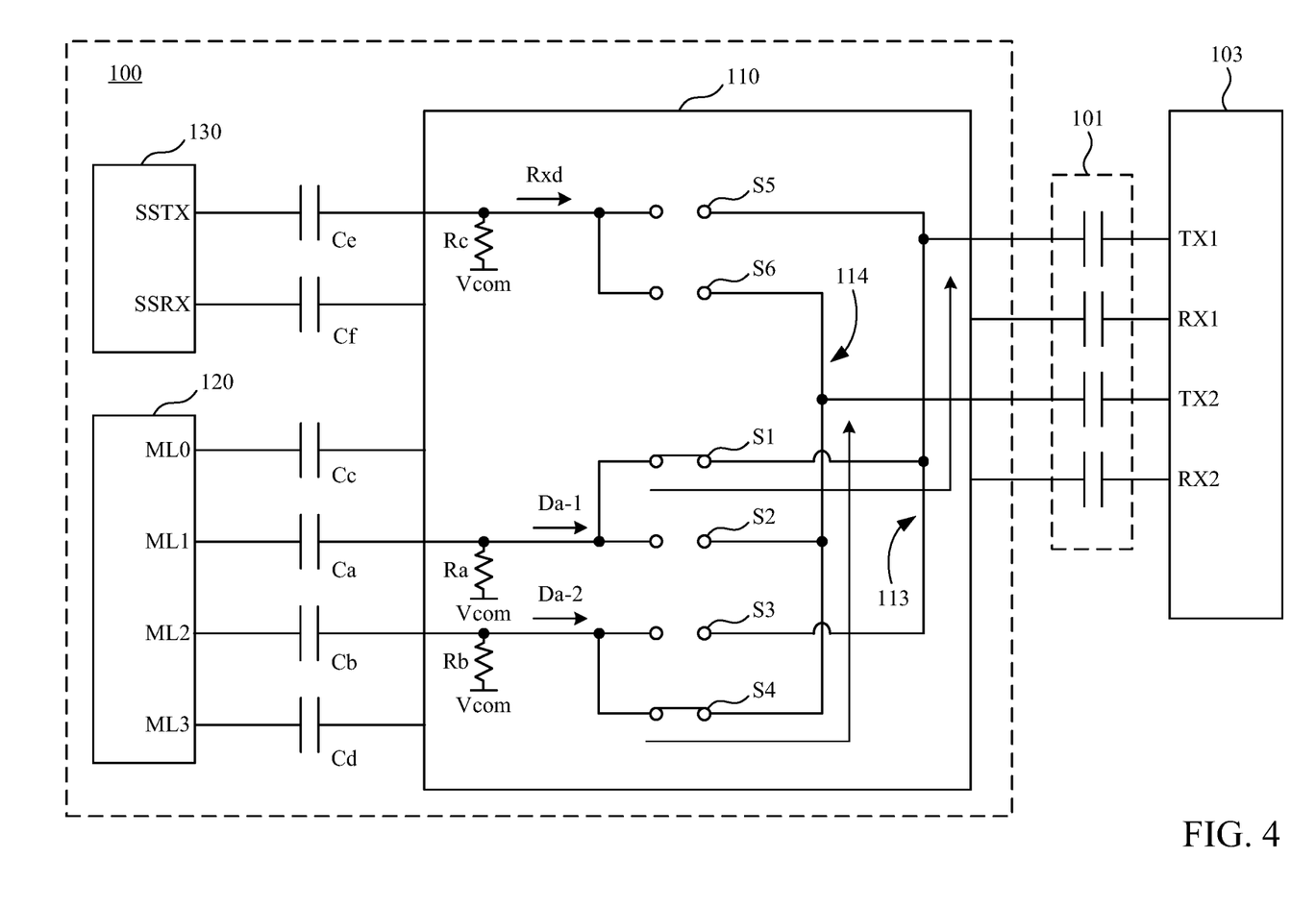
FIG. 4 is a schematic diagram of an equivalent circuit for illustrating the operation of the electronic device of FIG. 1 according to another embodiment of the present disclosure.

FIG. 4 is a schematic diagram of an equivalent circuit for illustrating the operation of the electronic device 100 according to another embodiment of the present disclosure. In this embodiment, the electronic device 100 is operated in the DP Alt mode for 4 lanes, and the USB connector 103 is coupled with the external device (not shown) in a second cable orientation. Therefore, the first switch S1 and the fourth switch S4 are conducted, and the second switch S2, the third switch S3, the fifth switch S5, and the sixth switch S6 are switched off. The aforesaid second cable orientation may be a situation that the second configuration channel (CC2) of the USB connector 103 is coupled with the pull-down resistor (not shown) of the external device.

Similar to FIG. 3, since the minimum voltage of the first data signals Da-1~Da-2, received by the first multiplexer 111 is higher than or equal to the minimum voltage of the second control signals Ctb-1~Ctb-2, the fifth switch S5 and the sixth switch S6 will not be erroneously conducted because of the first data signals Da-1~Da-2 transmitted on the transmission paths 113~114 so that the leakage current is prevent. As a result, the Rx detection signal Rxd will not be transmitted to the DisplayPort signal source 120 via the first switch S1 and the fourth switch S4, and the USB host 130 is able to correctly detect the high impedance and determine that there is no external USB device with which waiting for connection.

As can be appreciated from the foregoing descriptions, when the DisplayPort signal source 120 and the USB host 130 provide an excessive common voltage, the isolation capacitors protects the USB switching circuit 110 from the damage caused by insufficient pressure resistance. On the other hand, when the DisplayPort signal source 120 provides the common voltage that is too low, the USB switching circuit 110 will not conduct the wrong switch so that the USB host 130 will not perform erroneous operation. Therefore, the electronic device 100 has the advantage of high reliability.

Figure 5:
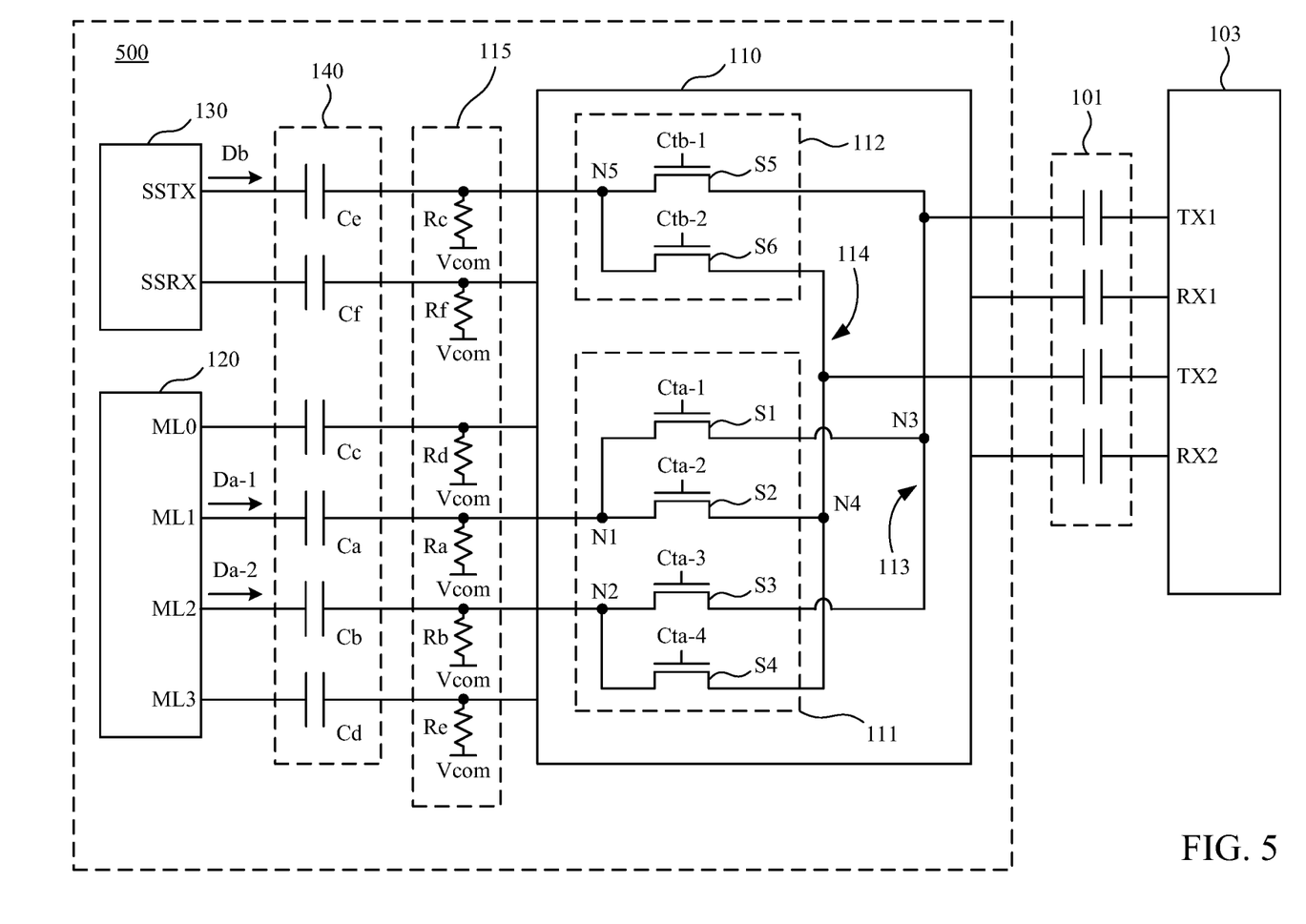
FIG. 5 is a simplified functional block diagram of an electronic device according to one embodiment of the present disclosure.

FIG. 5 is a simplified functional block diagram of an electronic device 500 according to one embodiment of the present disclosure. The voltage regulation circuit 115 of the electronic device 500 is disposed outside the USB switching circuit 110. In one embodiment, for example, the first multiplexer 111 and the second multiplexer 112 are disposed within an encapsulation package of the USB switching circuit 110 (not shown in FIG. 5) while the voltage regulation circuit 115 is disposed outside the encapsulation package.

The voltage regulation circuit 115 may be disposed on a substrate (e.g., a printed circuit board) on which the DisplayPort signal source 120, the USB host 130, and the isolation circuit 140 are disposed. In this case, the resistors Ra~Rf may be realized by various materials and methods and need not to be limited by specifications of integrated circuit processing, and thus the electronic device 500 has an advantage of high design flexibility. The foregoing descriptions regarding the other corresponding implementations, connections, operations, and related advantages of the electronic device 100 are also applicable to the electronic device 500. For the sake of brevity, those descriptions will not be repeated here.

Figure 6:
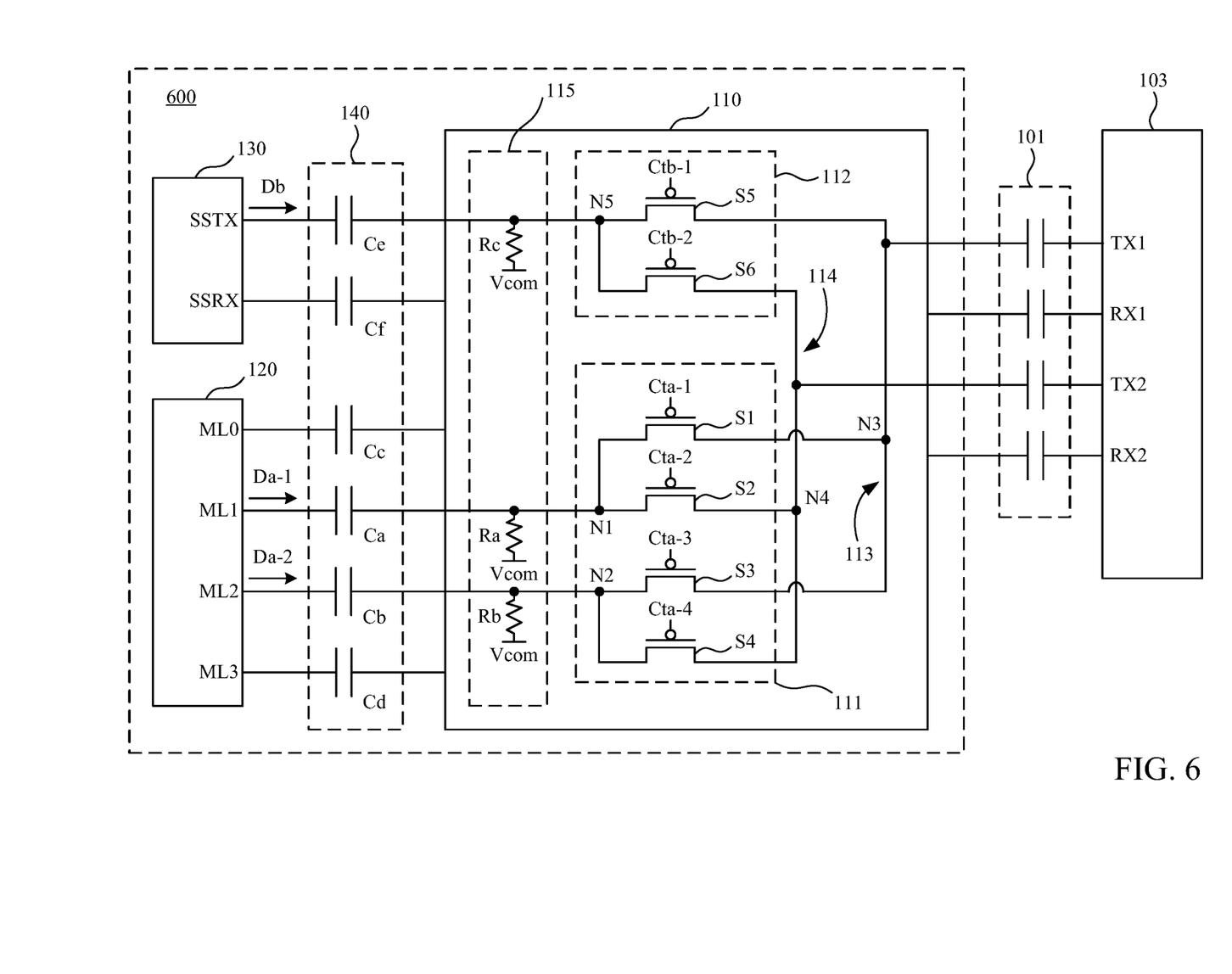
FIG. 6 is a simplified functional block diagram of an electronic device according to one embodiment of the present disclosure.

FIG. 6 is a simplified functional block diagram of an electronic device 600 according to one embodiment of the present disclosure. In this embodiment, switches of the USB switching circuit 110 are realized by P-type transistors, such as field-effect transistors or bipolar transistors.

In this embodiment, the isolation circuit 140 isolates the direct component transmitted from the DisplayPort signal source 120, and the voltage regulation circuit 115 provides the common voltage Vcom of 0.6 V~0.9 V to the USB switching circuit 110. The amplitudes of the first data signals Da-1~Da-2 are approximately ±0.3 V, and thus the first data signals Da-1~Da-2, received by the first multiplexer 111, may be 0.3V~1.2 V. The voltage range of the common voltage Vcom may be design based on the characteristics of the transistors of the USB switching circuit 110.

To prevent the fifth switch S5 and the sixth switch S6 from being erroneously conducted in the DP Alt mode for 4 lanes, the maximum voltage of the first data signals Da-1~Da-2, received by the first multiplexer 111, is lower than or equal to the maximum voltage of the second control signals Ctb-1~Ctb-2 (i.e., the voltage in the situation that the fifth switch S5 and the sixth switch S6 are switched off, such as 1.2 V). Additionally, the minimum voltage of the first data signals Da-1~Da-2 may be higher than the minimum voltage of the second control signals Ctb-1~Ctb-2 (i.e., the voltage in the situation that the fifth switch S5 and the sixth switch S6 are conducted, such as 0 V).

In one embodiment, for example, first data signals Da-1 and Da-2 are 0.3V~1.2V, and the second control signals Ctb-1~Ctb-2 are switched between 1.2 V and 0 V. When the electronic device 100 is operated in the DP Alt mode for 4 lanes, even the second control signals Ctb-1~Ctb-2 can only provide the maximum voltage of 1.2 V, the voltage difference between the control terminal and the second terminal (e.g., the gate-source voltage) of each of the fifth switch S5 and the sixth switch S6 will not be lower than 0 V. Therefore, the fifth switch S5 and the sixth switch S6 will not be erroneously conducted.

As a result, even the DisplayPort signal source 120 outputs an excessive voltage, the fifth switch S5 and the sixth switch S6 will not be erroneously conducted in the DP Alt mode for 4 lanes so as to prevent leakage currents. Therefore the USB host 130 is able to correctly determine that there is no external USB device with which waiting for connection.

In one embodiment, the voltage regulation circuit 115 of the electronic device 600 is disposed outside the encapsulation package of the USB switching circuit 110.

The foregoing descriptions regarding the other corresponding implementations, connections, operations, and related advantages of the electronic device 100 are also applicable to the electronic device 600. For the sake of brevity, those descriptions will not be repeated here.

In some embodiments, the USB host 130 provides moderate voltage that will not damage the USB switching circuit 110. In this case, the resistors Rc and Rf as well as the capacitors Ce and Cf of the electronic devices 100, 500, and 600 may be omitted to reduce the circuit area.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A universal serial bus (USB) switching circuit, comprising:
    a first multiplexer, configured to distribute a plurality of first data signals received by the first multiplexer to a plurality of transmission paths according to a plurality of first control signals;
    a second multiplexer, coupled with the first multiplexer through the plurality of transmission paths, and configured to distribute a second data signal received by the second multiplexer to the plurality of transmission paths according to a plurality of second control signals; and
    a voltage regulation circuit, coupled with the first multiplexer and the second multiplexer, and configured to set a maximum voltage and a minimum voltage of the plurality of first data signals received by the first multiplexer to corresponding to a common voltage, wherein the maximum voltage of the plurality of first data signals received by the first multiplexer is lower than or equal to a maximum voltage of the plurality of second control signals, or the minimum voltage of the plurality of first data signals received by the first multiplexer is higher than or equal to a minimum voltage of the plurality of second control signals;
    wherein the plurality of first data signals and the second data signal are generated according to different communication protocols.

2. The USB switching circuit of claim 1, wherein the first multiplexer comprises:
    a first switch;
    a second switch, wherein the first switch and the second switch are coupled with the voltage regulation circuit through a first node;
    a third switch; and
    a fourth switch, wherein the third switch and the fourth switch are coupled with the voltage regulation circuit through a second node, the first switch and the third switch are coupled with a first transmission path through a third node, and the second switch and the fourth switch are coupled with a second transmission path through a fourth node;
    wherein each of the first switch, the second switch, the third switch, and the fourth switch changes a switching state thereof according to a corresponding one of the plurality of first control signals.

3. The USB switching circuit of claim 2, wherein the second multiplexer comprises:
    a fifth switch, coupled between a fifth node and the first transmission path; and
    a sixth switch, coupled between the fifth node and the second transmission path;
    wherein each of the fifth switch and the sixth switch changes a switching state thereof according to a corresponding one of the plurality of second control signals.

4. The USB switching circuit of claim 3, wherein the voltage regulation circuit comprises:
    a first resistor, wherein a first terminal of the first resistor is coupled with the first node; and
    a second resistor, wherein a first terminal of the second resistor is coupled with the second node;
    wherein a second terminal of the first resistor and a second terminal of the second resistor are configured to receive the common voltage.

5. The USB switching circuit of claim 4, wherein the voltage regulation circuit further comprises:
    a third resistor, wherein a first terminal of the third resistor is coupled with the fifth node, and a second terminal of the third resistor is configured to receive the common voltage.

6. The USB switching circuit of claim 3, wherein if the first switch, the second switch, the third switch, the fourth switch, the fifth switch, and the sixth switch are N-type transistors, the minimum voltage of the plurality of first data signals received by the first multiplexer is higher than or equal to the minimum voltage of the plurality of second control signals;
    wherein if the first switch, the second switch, the third switch, the fourth switch, the fifth switch, and the sixth switch are P-type transistors, the maximum voltage of the plurality of first data signals received by the first multiplexer is lower than or equal to the maximum voltage of the plurality of second control signals.

7. An electronic device, comprising:
    a USB host;
    a DisplayPort signal source;
    a USB switching circuit, comprising:
        a first multiplexer, configured to distribute a plurality of first data signals from the DisplayPort signal source to a plurality of transmission paths according to a plurality of first control signals;
        a second multiplexer, coupled with the first multiplexer through the plurality of transmission paths, and configured to distribute a second data signal from the USB host to the plurality of transmission paths according to a plurality of second control signals; and
        a voltage regulation circuit, coupled with the first multiplexer and the second multiplexer, and configured to set a maximum voltage and a minimum voltage of the plurality of first data signals received by the first multiplexer to corresponding to a common voltage, wherein the maximum voltage of the plurality of first data signals received by the first multiplexer is lower than or equal to a maximum voltage of the plurality of second control signals, or the minimum voltage of the plurality of first data signals received by the first multiplexer is higher than or equal to a minimum voltage of the plurality of second control signals; and
    an isolation circuit, coupled with the DisplayPort signal source, and coupled with the first multiplexer through the voltage regulation circuit.

8. The electronic device of claim 7, wherein the isolation circuit is coupled with the USB host, and coupled with the second multiplexer through the voltage regulation circuit.

9. The electronic device of claim 7, wherein the first multiplexer comprises:
    a first switch;
    a second switch, wherein the first switch and the second switch are coupled with the voltage regulation circuit through a first node;
    a third switch; and a fourth switch, wherein the third switch and the fourth switch are coupled with the voltage regulation circuit through a second node, the first switch and the third switch are coupled with a first transmission path through a third node, the second switch and the fourth switch are coupled with a second transmission path through a fourth node;

wherein each of the first switch, the second switch, the third switch, and the fourth switch changes a switching state thereof according to a corresponding one of the plurality of first control signals.

10. The electronic device of claim 9, wherein the second multiplexer comprises:
a fifth switch, coupled between a fifth node and the first transmission path; and
a sixth switch, coupled between the fifth node and the second transmission path;
wherein each of the fifth switch and the sixth switch changes a switching state thereof according to a corresponding one of the plurality of second control signals.

11. The electronic device of claim 10, wherein the voltage regulation circuit comprises:
a first resistor, wherein a first terminal of the first resistor is coupled with the first node; and
a second resistor, wherein a first terminal of the second resistor is coupled with the second node;
wherein a second terminal of the first resistor and a second terminal of the second resistor is configured to receive the common voltage.

12. The electronic device of claim 11, wherein the voltage regulation circuit further comprises:
a third resistor, wherein a first terminal of the third resistor is coupled with the fifth node, and a second terminal of the third resistor is configured to receive the common voltage.

13. The electronic device of claim 12, wherein the isolation circuit comprises:
a first capacitor, coupled between the DisplayPort signal source and the first node;
a second capacitor, coupled between the DisplayPort signal source and the second node; and
a third capacitor, coupled between the USB host and the fifth node.

14. An electronic device, comprising:
a USB host;
a DisplayPort signal source;
a voltage regulation circuit;
a USB switching circuit, coupled with the voltage regulation circuit, and comprising:
a first multiplexer, configured to distribute a plurality of first data signals from the DisplayPort signal source to a plurality of transmission paths according to a plurality of first control signals; and
a second multiplexer, coupled with the first multiplexer through the plurality of transmission paths, and configured to distribute a second data signal from the USB host to the plurality of transmission paths according to a plurality of second control signals, wherein the voltage regulation circuit is configured to set a maximum voltage and a minimum voltage of the plurality of first data signals received by the first multiplexer to corresponding to a common voltage, wherein the maximum voltage of the plurality of first data signals received by the first multiplexer is lower than or equal to a maximum voltage of the plurality of second control signals, or a minimum voltage of the plurality of first data signals received by the first multiplexer is higher than or equal to a minimum voltage of the plurality of second control signals; and
an isolation circuit, coupled with the DisplayPort signal source, and coupled with the first multiplexer through the voltage regulation circuit.

15. The electronic device of claim 14, wherein the isolation circuit is coupled with the USB host, and coupled with the second multiplexer through the voltage regulation circuit.

16. The electronic device of claim 15, wherein the first multiplexer comprises:
a first switch;
a second switch, wherein the first switch and the second switch are coupled with the voltage regulation circuit through a first node;
a third switch; and
a fourth switch, wherein the third switch and the fourth switch are coupled with the voltage regulation circuit through a second node, the first switch and the third switch are coupled with a first transmission path through a third node, and the second switch and the fourth switch are coupled with a second transmission path through a fourth node;
wherein each of the first switch, the second switch, the third switch, and the fourth switch changes a switching state thereof according to a corresponding one of the plurality of first control signals.

17. The electronic device of claim 16, wherein the second multiplexer comprises:
a fifth switch, coupled between a fifth node and the first transmission path; and
a sixth switch, coupled between the fifth node and the second transmission path;
wherein each of the fifth switch and the sixth switch changes a switching state thereof according to a corresponding one of the plurality of second control signals.

18. The electronic device of claim 17, wherein the voltage regulation circuit comprises:
a first resistor, wherein a first terminal of the first resistor is coupled with the first node; and
a second resistor, wherein a first terminal of the second resistor is coupled with the second node;
wherein a second terminal of the first resistor and a second terminal of the second resistor are configured to receive the common voltage.

19. The electronic device of claim 18, wherein the voltage regulation circuit further comprises:
a third resistor, wherein a first terminal of the third resistor is coupled with the fifth node, and a second terminal of the third resistor is configured to receive the common voltage.

20. The electronic device of claim 19, wherein the isolation circuit comprises:
a first capacitor, coupled between the DisplayPort signal source and the first node;
a second capacitor, coupled between the DisplayPort signal source and the second node; and
a third capacitor, coupled between the USB host and the fifth node.

* * * * *